Patented July 12, 1927.

UNITED STATES PATENT OFFICE.

1,635,301

JULIUS ALSBERG, OF NEW YORK, N. Y., ASSIGNOR TO B. HELLER & COMPANY, OF CHICAGO, ILLINOIS, A CORPORATION OF ILLINOIS.

ART OF CURING MEATS.

No Drawing.   Application filed June 12, 1925. Serial No. 36,752.

My invention relates to improvements in the art of conserving or preserving meats, and the same has for its object to provide a simple, efficient and economical method of curing meats.

Further, said invention has for its object to provide a method of curing meats by means of which the curing of the meats may be effected in considerably shorter time than is now required, and with a considerably smaller amount of curing agents.

Further, said invention has for its object to provide a method of curing meats by means of which the losses due to spoilage will be materially reduced, and at the same time a product of higher grade or quality obtained.

Further, said invention has for its object to provide a method of curing meats according to which the meat requires a shorter period for the curing operation, and as a result a milder cure is obtained than is possible with method heretofore practiced.

Further, said invention has for its object to provide a method of curing meat by which the natural meat juices are retained in the meat, and not permitted or caused to pass off and be lost as occurs where the cure is effected by a brine solution or pickle.

Further, said invention has for its object to provide a method of curing bacon and other meats which does not require the repeated "overhauling" of the meat while the same is undergoing cure.

Further, said invention has for its object to provide a method by means of which the curing medium containing nitrite may be introduced into the product without requiring the immersing of the product into a solution or curing liquid containing the element or ingredients necessary to effect the cure.

Further, said invention has for its object to provide a method of curing meat in which the meat is first charged or saturated with a curing medium containing nitrite, and thereafter enveloped with a dry, curing medium containing a higher nitrite content than that of the curing medium with which the meat is first charged or saturated.

Further, said invention has for its object to provide a method by means of which the curing operation may, according to the kind of meat to be treated, be completed in periods ranging from one half to two thirds of the time now required.

Further, said invention has for its object to provide a method of curing meats in which the meat need not be removed from the dry, curing medium immediately after the cure has been effected or completed, but may be permitted to remain in said medium for several months or more, until the meat is to be smoked.

Further, objects will in part be obvious, and in part be hereinafter described.

To the attainment of the aforesaid objects and ends my invention consists in the novel method comprising the successive steps hereinafter more fully described and then pointed out in the claims.

In carrying out my method of curing meats, such as ham, corn beef and the like, I proceed as follows. For the purposes of illustration I shall describe my invention in connection with the curing of ham, in which I first treat the ham with a suitable curing medium, preferably a brine solution consisting of the following named ingredients in about the proportions specified:

|  | Per cent. |
|---|---|
| Common salt | 25.00 |
| Water | 74.92 |
| Sodium nitrite | 0.08 |
|  | 100.00 |

While the curing medium above described will act as a satisfactory agent, the addition of a small amount of sodium nitrate,—about one half of one per cent,—will materially enhance the curing properties of the composition, and produce a milder cure.

If the ham is to be "sugar-cured" the proportion above indicated should be modified, to allow for the addition of the desired amount of cane or beet sugar. A satisfactory result may be obtained by the addition of about one pound of sugar to one gallon of the above described curing medium.

The curing medium is "pumped" into the ham at a plurality of points in order to permit or cause the same to work its way into the body of the meat to thoroughly charge or impregnate the same.

The ham is then momentarily immersed in a suitable receptacle containing a quantity of the above described curing solution but in which the nitrite content has been preferably somewhat increased, whereupon the surface of the ham, while still moist is preferably rubbed with coarse salt in order to give the same a comparatively thin coating.

The ham, as thus prepared, is then disposed in a suitable container or storage chamber, the base or floor of which is covered with a layer of dry curing mixture composed of salt and nitrite in about the proportions below stated,

| | Per cent. |
|---|---|
| Common salt | 99.8 |
| Sodium nitrite | 00.2 |
| | 100.0 | and the meat disposed thereon in layers, and each layer completely enveloped with further quantities of said dry curing mixture. Additional layers of meat are then piled upon said first layer, and enveloped with said dry curing mixture until the container is filled, or the meat is stacked to the desired height, and is completely enveloped with said dry curing mixture and protected against direct contact with the air either by salt alone or by a combination of said curing mixture and salt.

If, as above stated, the ham is to be "sugar-cured" the dry cure composition should be modified to compensate for the addition of cane or beet sugar to an amount depending upon the degree of sweetness desired.

The meat as thus prepared is permitted to cure without further attention for a period averaging about three days per pound of the average weight of the hams, during which time a temperature preferably of about 38° Fahrenheit is maintained.

At the expiration of said curing period the meat may be removed and subjected to the smoking operation in the customary manner. If the meat is not to be smoked at the conclusion of the curing operation, the same may be left enveloped in the dry-curing medium at a temperature just above the freezing point for several months without attention, and until such time as the packer is ready to prepare the meat for smoking, and then smoke the same.

It is to be noted particularly that by means of my improved method the time for curing ham is reduced to about two thirds the time now required, and that as the cure is effected in such shorter time it is much milder, and results in a product of superior flavor, taste and quality.

Further, it is to be noted that as the curing is effected by the use of a dry curing medium the meat is left firm and solid at the expiration of the curing period, and may be left in cure for considerable periods of time thereafter, at reduced temperature, without risk of injury or deterioration. It will, of course, be understood that bacon or other meats which come in comparatively thin form do not require the "pumping" operation above described and that, if the ham is not to be "sugar-cured" the sugar may be omitted from the curing mediums first above described, without departing from the scope of the invention as defined by the claims.

Having thus described my said invention what I claim and desire to secure by Letters Patent is:—

1. The herein described method of curing meats which consists in enveloping the same with a dry curing medium including a predetermined amount of nitrite as an added element, substantially as specified.

2. The herein described method of curing meats which consists in charging the same with a curing liquid, and then enveloping the treated meat with a dry curing medium containing nitrite, substantially as specified.

3. The herein described method of curing meats which consists in charging the same with a curing liquid containing nitrite, and then completely enveloping the charged meat with a dry curing medium in finely subdivided state containing nitrite, substantially as specified.

4. The herein described method of curing meats which consists in charging the same with a curing liquid, subjecting the meat to the action of a medium to render the same capable of retaining an enveloping substance, and then completely enveloping the treated meat with a dry curing medium containing nitrite, substantially as specified.

5. The herein described method of curing meats which consists in charging the same with a curing liquid containing nitrite, subjecting the meat to the action of a liquid curing medium to render the same capable of retaining an enveloping substance, and then completely enveloping the treated meat with a dry curing medium containing nitrite, substantially as specified.

6. The herein described method of curing meats which consists in charging the same with a curing liquid containing nitrite, subjecting the meat to the action of a curing liquid having a higher nitrite content than the curing liquid with which the meat is charged, and then enveloping the treated meat with a dry, curing medium containing nitrite, substantially as specified.

7. The herein described method of curing meats which consists in charging the same with a curing liquid containing salt, and nitrite in the form of a soluble salt, immersing the meat in a curing liquid containing the same ingredients of the liquid with which the meat is charged, and then completely enveloping the charged and treated meat with a dry, curing medium consisting of salt, substantially as specified.

8. The herein described method of curing meats which consists in charging the same with a curing liquid containing salt, and nitrite in the form of a soluble salt, immersing the meat in a curing liquid containing the same ingredients of the liquid with which the meat is charged, and then completely enveloping the charged and treated meat with a dry, curing medium consisting of salt and a soluble nitrite, substantially as specified.

9. The herein described method of curing meats which consists in charging the same with a curing liquid containing nitrite, completely enveloping the charged meat with a dry curing medium containing nitrite, and subjecting the charged, enveloped meat to the action of said dry, curing medium for a period ranging from forty to sixty days, substantially as specified.

10. The herein described method of curing meats which consists in charging the same with a curing liquid composed of sodium chloride, a nitrate, and a salt of nitrous acid, completely enveloping the charged meat with a dry curing medium containing nitrite, and subjecting the charged, enveloped meat to the action of said dry, curing medium for a period ranging from forty to sixty days, substantially as specified.

11. The herein described method of curing meats which consists in charging the same with a curing liquid containing nitrite, completely enveloping the charged meat with a dry, curing medium containing nitrite, and then subjecting the charged meat to the action of said curing medium at a temperature of about 38° F. for a period ranging from forty to sixty days, substantially as specified.

12. The herein described method of curing meats which consists in charging the same with a curing liquid composed of sodium chloride, a nitrate, and sodium nitrite, completely enveloping the charged meat with a dry, curing medium containing a nitrite, and then subjecting the charged meat to the action of said curing medium at a temperature of about 38° F. for a period ranging from forty to sixty days, substantially as specified.

13. The herein described method of curing meats which consists in charging the same with a curing liquid containing sodium chloride 25%, sodium nitrite 0.08%, enveloping the charged meat with a dry curing medium containing a soluble nitrite 0.7%, and then subjecting the thus prepared meat to the action of said curing mediums until the curing operation is completed, substantially as specified.

Signed at the city of New York, in the county and State of New York, this 10th day of June, one thousand nine hundred and twenty-five.

JULIUS ALSBERG.